Patented Sept. 10, 1929.

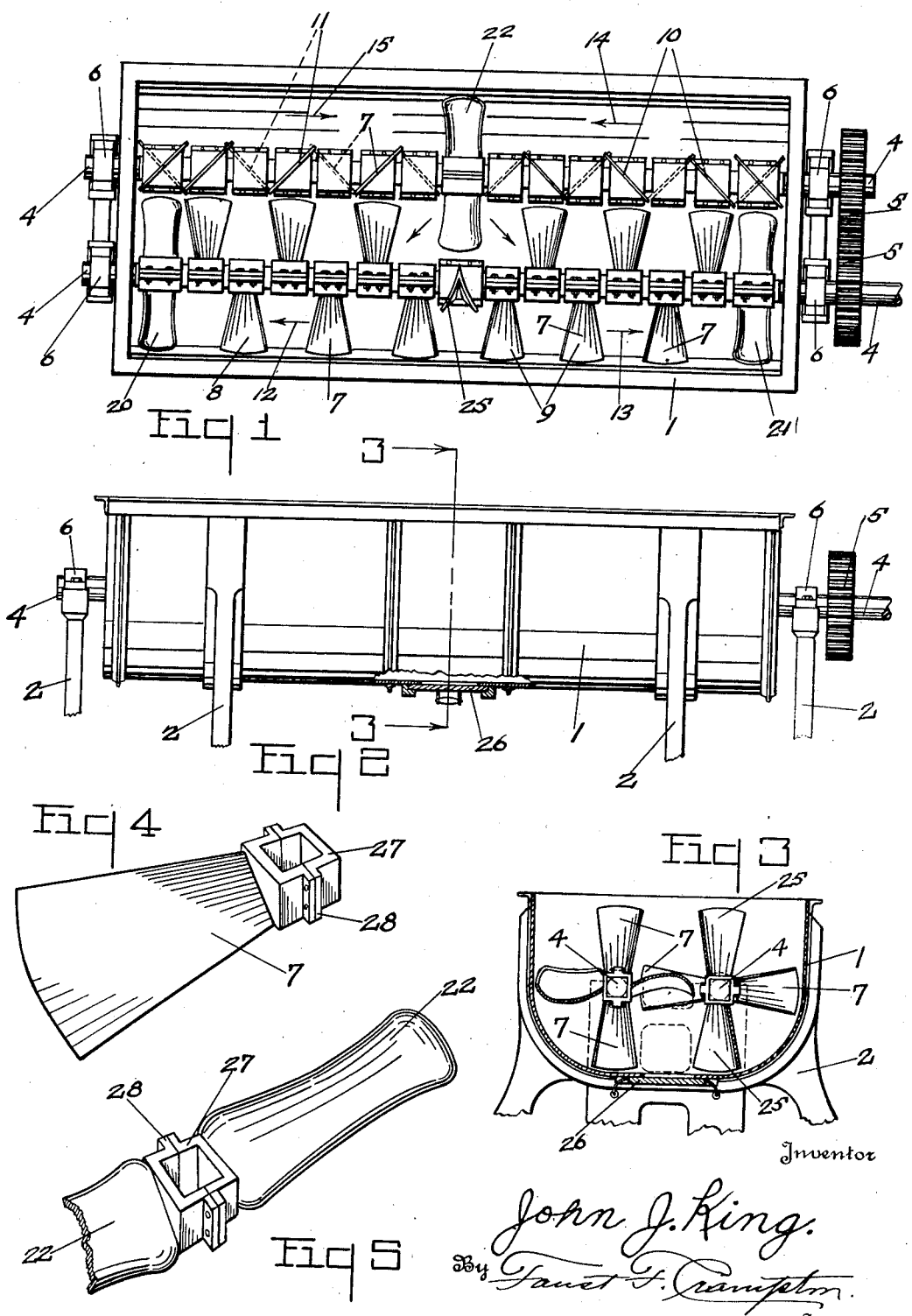

1,727,992

UNITED STATES PATENT OFFICE.

JOHN J. KING, OF TOLEDO, OHIO.

MORTAR MIXER.

Application filed March 3, 1928. Serial No. 258,702.

My invention has for its object to provide a mixer for plastic materials that will permit the material to be continuously supplied to the mixer, thoroughly mixed, and withdrawn from the mixer from time to time. The invention particularly provides a substantially continuous circuitous movement of the materials while being mixed in a path which crosses to produce a constant intermixing of the materials as new material is added to the previously mixed plastic material. Preferably, the materials follow a figure 8 path in the operation of the mixer. The invention provides four sets of mixing or propelling blades that operate to continuously move the materials and thus, by the flowing movement, an efficient mixing operation is performed. Also, the invention provides throw-over, spoon-shaped blades that work the material to points of engagement of the propelling blades.

The invention has for its object other features and advantages which will appear from the following description and upon examination of the accompanying drawing.

The invention may be contained in mixing machines of different forms and used for different purposes and, to illustrate a practical application of the invention, I have selected a mortar mixing machine as an example of the various constructions that may be so formed as to embody my invention, and shall describe the construction selected hereinafter. The mortar mixing machine referred to is shown in the accompanying drawing.

Fig. 1 is a top view of the mixing machine, the cover of the machine being shown removed in order to illustrate the interior of the receptacle or trough that may be used for containing the materials as they are being mixed by the machine. Fig. 2 is a side view of the machine illustrated in Fig. 1. Fig. 3 is a view of a section taken on the plane of the line 3—3 indicated in Fig. 2. Fig. 4 is a perspective view of one of the propelling blades. Fig. 5 illustrates one of the throw-over blades used to transfer the material from one set of propelling blades to a point where it may be engaged by another set of propelling blades.

In the particular form of construction shown in the drawing, which is designed for mixing mortar, a trough 1 is supported on a suitable frame 2 and is provided with a pair of shafts 4 that are driven by a suitable source of power to which one of the shafts 4 is connected. The shafts 4 are interconnected by a pair of gear wheels 5 so as to cause the shafts 4 to rotate in opposite directions. The shafts 4 are supported in suitable bearings 6 that are located on the frame 2 and extend through the ends of the receptacle or trough 1.

A plurality of mixing paddles or propeller blades 7 are connected to the shafts 4. The propeller blades 7 are inclined to the plane of the rotation of their end points to propel the plastic material as it is deposited in the trough 1 along the walls of the trough 1.

The propeller blades 7 are divided into four sets 8, 9, 10, and 11. The set 8 of the propeller blades 7 are so inclined that with the rotation of the shafts 4, to which they are connected, the blades 7 will propel the material in the direction of the arrow 12, that is, to the left end of the trough 1, while the set 9, of the propeller blades 7, operate to propel the plastic material in the direction of the arrow 13, namely, to the right end of the trough 1. Owing to the reversed rotation of the other shaft 4, and the direction of inclination of the set 10 of propeller blades 7, they operate to propel the material in the direction of the arrow 14, that is, towards the left end of the trough 1, while the set 11, or propeller blades 7, operates to propel the material in the direction of the arrow 15, that is, towards the right end of the trough 1. While the material is thus being propelled, it is being thoroughly mixed by the movement of the material over the surface of the trough 1, and the movement of the surfaces of the blades 7 over the material. Thus the material at the sides of the trough 1 will move in the direction of the arrows 12, 13, 14, and 15, while the bulk of the material, that may be distributed in the center of the trough 1, will remain there but a short time owing to the rotation of the blades 7 which operate to push the material towards the sides of the trough 1. Moreover, since the propelling blades 7, located on the two shafts 4, rotate in circles that overlap, and the propelling action of the blades 7 of one shaft 4 is opposite in direction to the propelling action of the propelling blades 7 on the corresponding portion of the other shaft 4, the material located in the central portion of the trough 1 will not be propelled in either direction on account of the counteraction of the blades 7 within the region of the central part of the trough 1.

In order to transfer the material from the points of delivery of one of the sets 8 or 9 of the blades 7 to the point of engagement of another set 11 or 10 of the blades, I have provided, moreover, spoon-shaped blades 20 and 21 that will gather the material and transfer it from one point in a path of movement of the material created by the blades 7 of one shaft 4 and deliver it to a point in the path of movement created by the blades 7 of the other shaft 4. Thus the spoon-shaped blades 20 and 21 are so located that they will scoop the material, that is delivered to them by the sets 8 and 9 of the blades 7, and deposit it into the center of the trough 1 so as to be eventually engaged by the propelling blades 7 of the sets 11 and 10, the blades 20 and their edges in planes of the axis of the shaft 4 to which they are connected. Thus the material that is progressed by the sets 8 and 9 in the direction of the arrows 12 and 13 will be transferred to the opposite side of the trough 1 and propelled in the direction of the arrows 14 and 15 towards the center of the trough 1 where, by my invention, is provided a pair of throw-over spoon-shaped blades that will direct the material alternately towards the set 8 of propelling blades 7 and to the set 9 of the propelling blades 7. Thus, on the center of one of the shafts 4, is provided a pair of spoon-shaped throw-over blades 22 having edges that are located in planes that are inclined in substantially the same direction to the plane of the rotation of the blades 22, that is, to the plane of the circle described by the tips of the blades 22 whereby the spoon-shaped blades 22 will alternately direct the material towards the set 8 and then towards the set 9, where it will be eventually engaged by the propelling blades 7 of the said sets 8 and 9, and portions will be directed in opposite directions as indicated by the arrows 12 and 13. In order to aid the division of the material that is thus transferred from one side of the trough 1 to the other side, my invention provides a pair of blades 25 that have V-cross sectional shapes that operate to spread the material laterally towards the sets 8 and 9 of the propelling blades 7. Preferably, the V-shaped blades 25 have a slight concavity to cause a freer movement of the blades 25 through the material and to better spread the material to be engaged by the blades 7 of the sets 8 and 9. Thus, by my invention, the plastic material will be caused to flow in a figure 8 path which crosses at the center of the trough 1 and extends in opposite directions, either towards or away from the center of the trough 1 and across the ends of the trough 1, and so that the materials may be fed into the trough 1 at any point and the mixed plastic material may be continuously drawn off, or drawn off from time to time, and yet there will be produced a constant mixing of the materials, as they are fed to the trough 1, and also a constant mixing of the new materials with the plastic material that has been previously formed.

A suitable outlet in the form of a sliding door 26 may be formed in the bottom of the receptacle, or trough 1, in order to permit the dumping of the materials or such portions thereof as may be desired and into suitable receptacles or containers, such as wheel-barrows, that may be used for conveying the mixed mortar to the points at which the mortar is used in constructing buildings. Preferably, the trough 1 is raised above the floor or base from the ground by the frame 2 to permit the placement of wheel-barrows beneath the door 26 which controls the delivery of the mortar from the trough 1.

The blades 7, 20, 21, and 22, may be connected to the shafts 4 by any suitable means. In the particular form of construction shown, the portions of the shaft 4, located within the trough 1, are formed to have square cross sections and the blades are provided with hubs 27 having square openings. Preferably, the hubs 27 are split so that the blades may be readily placed on the shafts 4. The parts of each of the hubs 27 may be secured together by any suitable means, such as by tap bolts that are threaded through the walls of each hub 27, or the parts of the hubs 27 may be provided with the flanges 28 through which suitable bolts may be inserted, such as machine bolts, or, if desired, the flanges of one part of the hub 27 may be tapped and tap bolts be used for securing the parts of each hub together.

I claim:

1. In a mixer, a receptacle, a pair of shafts rotatably supported in the receptacle, a plurality of propeller blades connected to the shafts and operating to propel the material toward opposite ends of the receptacle and along opposite sides thereof and a transferring blade connected to one of the shafts for transferring the material from one side of the receptacle to the other side.

2. In a mixer, a receptacle, a pair of shafts rotatably supported in the receptacle, a plurality of propeller blades connected to the shafts and operating to propel the material toward opposite ends of the receptacle and along opposite sides thereof and transferring blades connected to the shafts and located at the ends of the receptacle operating to transfer the material from one side of the receptacle to the other at opposite ends of the receptacle.

3. In a mixer, a receptacle, a pair of shafts rotatably supported in the receptacle, a plurality of propeller blades connected to the shafts and operating to maintain a large portion of the material at the sides of the receptacle, and to propel the material in opposite directions and along opposite sides and transferring blades located at opposite ends of one of the shafts for transferring material from the side of the receptacle on which the last named shaft is located to the other side of the receptacle.

4. In a mixer, a receptacle, a pair of shafts rotatably supported in the receptacle, a plurality of propeller blades connected to the shafts and operating to maintain a large portion of the material at the sides of the receptacle, and to propel the material in opposite directions and along opposite sides and transferring blades located at opposite ends of one of the shafts and in the central part of the receptacle and of the other shaft for transferring the material and from the side on which the shaft having the transferring blade is located to the opposite side of the receptacle.

5. In a mixer, a receptacle, a pair of shafts rotatably supported in the receptacle, a plurality of propeller blades connected to the shafts and operating to maintain a large portion of the material at the sides of the receptacle and to propel the material in opposite directions and along opposite sides of the receptacle and transferring blades located in a central part of the receptacle for transferring the material from one side of the receptacle to the other side of the receptacle.

6. In a mixer, a receptacle, a pair of shafts rotatably supported in the receptacle, a plurality of propeller blades connected to the shafts and operating to maintain a large portion of the material at the sides of the receptacle and to propel the material in opposite directions and transferring blades connected to one of the shafts and inclined in the same direction from the plane of the circle described by the tips of the blades to transfer the material from one side of the receptacle to the other side of the receptacle in directions that are inclined to a vertical plane extending parallel to the axis of the shaft and alternately towards opposite ends of the receptacle.

7. In a mixer, a receptacle, a pair of shafts rotatably supported in the receptacle, a plurality of propeller blades connected to the shafts and operating to maintain a large portion of the material at the sides of the receptacle and to propel the material in opposite directions, transferring blades connected to one of the shafts and inclined in the same direction from the plane of the circle described by the tips of the blades to transfer the material from one side of the receptacle to the other side of the receptacle in directions that are inclined to a vertical plane extending parallel to the axis of the shaft and alternately towards opposite ends of the receptacle and a pair of transferring blades located at opposite ends of the other shaft for transferring the material to the opposite side of the receptacle.

8. In a mixer, a receptacle, a pair of shafts rotatably supported in the receptacle, a plurality of propeller blades connected to the shafts and having ends that describe overlapping circles and operating to maintain a large portion of the material at the sides of the receptacle and to propel the material in opposite directions, transferring spoon-shaped blades extending in opposite directions from the shaft on which they are mounted and having edges that are located in planes that are inclined in the same direction from the plane of the circle described by the tips of the blades to transfer the material from one side of the receptacle to the other side of the receptacle in directions that are inclined to a vertical plane extending parallel to the axis of the shaft and alternately towards opposite ends of the receptacle and a pair of V-shaped blades located on the other shaft for spreading the material in directions towards the ends of the receptacle, and propeller blades for propelling the material between the central part of the receptacle and the ends.

In witness whereof I have hereunto signed my name to this specification.

JOHN J. KING.